United States Patent
Toyosumi et al.

(10) Patent No.: US 6,565,938 B1
(45) Date of Patent: May 20, 2003

(54) RESIN COMPOSITION AND LAYERED PRODUCT

(75) Inventors: Masahiko Toyosumi, Kurashiki (JP); Kenji Ninomiya, Ibaraki (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 119 days.

(21) Appl. No.: 09/868,928

(22) PCT Filed: Nov. 16, 2000

(86) PCT No.: PCT/JP00/08110

§ 371 (c)(1), (2), (4) Date: Nov. 9, 2001

(87) PCT Pub. No.: WO01/36534

PCT Pub. Date: May 25, 2001

(30) Foreign Application Priority Data

Nov. 16, 1999 (JP) .......................... 11-324790
Dec. 3, 1999 (JP) .......................... 11-344750

(51) Int. Cl.$^7$ .............................. B32B 27/28
(52) U.S. Cl. ................. 428/36.6; 428/36.7; 428/475.8; 428/476.1; 428/476.3; 428/520; 428/522; 524/404; 524/405; 525/60
(58) Field of Search ............................ 428/475.8, 476.1, 428/476.3, 36.6, 36.7, 520, 522; 525/60; 524/404, 405

(56) References Cited

U.S. PATENT DOCUMENTS

| 4,855,181 A | * | 8/1989 | Shimo et al. ................ 428/336 |
| 4,999,229 A | * | 3/1991 | Moritani et al. ............ 428/36.6 |
| 5,069,946 A | * | 12/1991 | Moritani et al. ............ 428/36.6 |

FOREIGN PATENT DOCUMENTS

JP 4-131237 5/1992

* cited by examiner

*Primary Examiner*—D. Lawrence Tarazano
(74) *Attorney, Agent, or Firm*—Armstrong, Westerman & Hattori, LLP

(57) ABSTRACT

A resin composition comprising a saponified ethylene-vinyl acetate copolymer (A), a polyamide resin having a melting point not exceeding 160° C. (B), and a small proportion of a boron compound (C) and a laminate comprising a multi-lamellar shaped article comprised of the above resin composition layer (X) and a thermoplastic resin layer (Y).

6 Claims, No Drawings

RESIN COMPOSITION AND LAYERED PRODUCT

TECHNICAL FIELD

The present invention relates to a resin composition comprising a saponified ethylene-vinyl acetate copolymer (hereinafter referred to briefly as EVOH) and a laminate comprising the same. More particularly, the invention relates to a resin composition capable of providing shaped articles outstanding in such characteristics as gas barrier properties, low-temperature heat drawability, long-run melt moldability, and appearance and to a laminate comprising said resin composition, such as a multi-lamellar vessel.

BACKGROUND ART

EVOH generally is good in clarity, gas barrier properties, aroma retentivity, solvent resistance and oil resistance, among other properties, and, exploiting these features, have heretofore been used in various packaging applications, namely as packaging materials for foods, pharmaceuticals, industrial chemicals and agrochemicals.

The sheet (inclusive of film) of EVOH is frequently stretched under heating for improving its mechanical strength and other properties and the heat-drawability of an exclusive EVOH sheet or a multi-layer sheet comprising an EVOH layer is an important requirement.

Particularly in recent years, a multi-lamellar vessel comprising a laminate comprised of a polystyrene resin layer and an EVOH layer, which is excellent in rigidity, clarity and surface gloss, is attracting attention. Thus, a multi-lamellar vessel having a laminar structure having a polystyrene resin layer on either side, i.e. the inside and outside of the vessel, namely "the polystyrene resin layer/adhesive resin layer/ EVOH layer/adhesive resin layer/polystyrene layer" and a multi-lamellar vessel comprising a polyethylene layer, which has good heat sealability by itself, as the innermost layer constituting the inside wall of the vessel and a polystyrene resin layer as the outermost layer constituting the outside wall of the vessel, namely the "polyethylene resin layer/adhesive resin layer/EVOH layer/adhesive resin layer/ polystyrene resin layer" are demanded by the market as very useful packaging materials.

Furthermore, laminates not using polystyrene resin, such as one having the "polyethylene resin layer/adhesive resin layer/EVOH layer/adhesive resin layer/polyethylene resin layer structure" and one having the "polyethylene resin layer/adhesive resin layer/EVOH layer/adhesive resin layer/ polypropylene resin layer structure" are also demanded by the ecology-conscious market.

However, EVOH is inferior to thermoplastic resins such as polystyrene and polyolefin in heat-drawability or heat-moldability. To overcome this drawback, the following corrective methods, among others, have so far been proposed.
(1) The method which comprises adding a plasticizer to EVOH (JP Kokai S53-88067; JP Kokai H59-20345).
(2) The method which comprises blending a polyamide resin with EVOH (JP Kokai S52-141785; JP Kokai S58-36412).
(3) The method which comprises using a resin composition comprising two or more different grades of EVOH (JP Kokai S61-4752, S60-173038, S63-196645, S63-230757, S63-264656, H2-261847).
(4) The method which comprises blending a copolymer polyamide resin having a defined melting point with EVOH (JP Kokai S62-225543, S62-225544, S63-114645).

However, detained investigations by the present inventors revealed that the EVOH compositions described in the above literature have the following disadvantages.

The compositions disclosed in the above first group (1) of literature are drastically handicapped in gas barrier properties.

The compositions disclosed in the second group (2) of literature tend to be low in long-run melt-moldability.

The compositions disclosed in the above third and fourth groups (3) and (4) of literature have been somewhat improved in heat-drawability but are not satisfactory enough for use in applications where laminates with a polystyrene resin are heat-drawn in a high draw ratio at a low temperature, and have room for further improvement.

In addition, there is room for improvement in the appearance of a multi-lamellar vessel and in deep-drawability.

Under the circumstances, the present invention has for its object to provide an EVOH resin composition capable of providing shaped articles outstanding in gas barrier properties, low-temperature heat-drawability, long-run melt-moldability and appearance, among other characteristics, and a multi-lamellar vessel or other laminate comprising said resin composition.

DISCLOSURE OF INVENTION

The resin composition of the invention comprises a saponified ethylene-vinyl acetate copolymer (A), a polyamide resin having a melting point of not higher than 160° C. (B), and a boron compound (C).

The laminate of the invention is a multi-lamellar shaped article comprising a resin composition layer (X) composed of a saponified ethylene-vinyl acetate copolymer (A), a polyamide resin (B) having a melting point not exceeding 160° C., and a boron compound (C) and, as disposed on at least one side of said layer (X), a thermoplastic resin layer (Y). A representative example of said laminate is a heat-drawn multi-lammelar vessel as draw-molded in a draw ratio of 4~20.

The invention is now described in detail.

<EVOH (A)>

The EVOH (A) for use in the invention is not particularly restricted but is preferably one having an ethylene content of 10~70 mole % (especially 20~60 mole %, particularly 25~50 mole %) and a saponification degree of not less than 90 mole % (especially not less than 95 mole %, particularly not less than 99 mole %) If the ethylene content is less than 10 mole %, the high-temperature gas barrier properties, melt-moldability and appearance will become inadequate. On the other hand, if it exceeds 70 mole %, no sufficient gas barrier properties will be obtained. If the degree of saponification is less than 90 mole %, the gas barrier properties, thermal stability and moisture resistance will be inadequate.

The melt flow rate (MFR) (as measured at 210° C. under a load of 2160 g) of EVOH (A) is not particularly restricted but is preferably in the range of 0.5~100 g/10 min (especially 1~50 g/10 min, particularly 3~35 g/10 min). If the melt flow rate is below the above-mentioned range, the extruder interior will develop a high-torque condition at molding to make extrusion difficult. On the other hand, if the MFR is in excess of the above-mentioned range, the thickness accuracy of the shaped article tends to be decreased.

EVOH (A) can be obtained by saponifying an ethylene-vinyl acetate copolymer (EVA) produced by the known polymerization technology such as solution polymerization, suspension polymerization or emulsion polymerization. The saponification of the ethylene-vinyl acetate copolymer (EVA) can also be carried out by the known technology.

The EVOH (A) mentioned above may have been "copolymerization-modified" with a copolymerizable ethylenically unsaturated monomer up to the extent not interfering with the effect of the invention. The monomer which can be used in this manner includes olefins such as propylene, 1-butene, isobutene, etc.;

unsaturated acids such as acrylic acid, methacrylic acid, crotonic acid, phthalic acid (anhydride), maleic acid (anhydride), itaconic acid (anhydride), etc. and their salts or mono- or dialkyl ($C_{1-18}$) esters;

acrylamides such as acrylamide, N-($C_{1-18}$) alkylacrylamides, N,N-dimethylacrylamide, 2-acrylamidopropanesulfonic acid and its salts, and acrylamidopropyldimethylamine and its acid salts or quaternary salts;

methacrylamides such as methacrylamide, N-($C_{1-18}$) alkylmethacrylamides, N,N-dimethylmethacrylamide, 2-methacrylamidopropanesulfonic acid and its salts, methacrylamidopropyldimethylamine and its acid salts or quaternary salts;

N-vinylamides such as N-vinylpyrrolidone, N-vinylformamide, N-vinylacetamide, etc.;

vinyl cyanides such as acrylonitrile, methacrylonitrile, etc.;

vinyl ethers such as ($C_{1-18}$) alkyl vinyl ethers, hydroxyalkyl vinyl ethers, alkoxyalkyl vinyl ethers, etc.;

vinyl halides such as vinyl chloride, vinylidene chloride, vinyl fluoride, vinylidene fluoride, vinyl bromide, etc.;

vinylsilanes such as trimethoxyvinylsilane etc.;

allyl acetate, allyl chloride, allyl alcohol, dimethylallyl alcohol, trimethyl (3-acrylamido-3-dimethylpropyl)ammonium chloride, acrylamido-2-methylpropanesulfonic acid and so on.

Furthermore, it may be a post-modified EVOH as obtained by urethanation, acetalization, cyano-ethylation or the like.

As the EVOH (A), two or more different grades of EVOH may be used. Thus, it is possible to use a blend of EVOH species varying in ethylene content by not less than 5 mole % or varying in the degree of saponification by not less than 1 mole %, or a blend of EVOH species with MFR ratios of not less than 4. To use a blend of EVOH species is useful, because it may contribute to improved flexibility, heat-moldability and film-making stability while the gas barrier properties are sustained.

<Polyamide Resin (B)>

The polyamide resin (B) for use in the invention must have a melting point of not more than 160° C. Use of a polyamide resin melting at a temperature higher than 160° C. will not be rewarded with the effect of the invention. The melting-point range is preferably 80~150° C., more preferably 80~140° C.

The melting point in the present context represents the peak melting temperature (° C.) as measured using a differential scanning calorimeter at a temperature-raising speed of 10° C./min.

The polyamide resin (B) specifically includes:

polycarproamide (nylon 6),
poly-ω-aminoheptanoic acid (nylon 7)
poly-ω-aminononanic acid (nylon 9),
polyundecanamide (nylon 11),
polylaurolactam (nylon 12),
polyethylenediamineadipamide (nylon 26),
polytetramethyleneadipamide (nylon 46),
polyhexamethyleneadipamide (nylon 66),
polyhexamethylenesebacamide (nylon 610),
polyhexamethylenedodecamide (nylon 612),
polyoctamethyleneadipamide (nylon 8, 6),
polydecamethyleneadipamide (nylon 108),
caprolactam/laurolactam copolymer (nylon 6/12),
caprolactam/ω-aminononanoic acid copolymer (nylon 6/9),
caprolactam/hexamethylenediammonium adipate copolymer (nylon 6/66),
laurolactam/hexamethylenediammonium adipate copolymer (nylon 12/66),
ethylenediamineadipamide/hexamethylenediammonium adipate copolymer (nylon 26/66),
caprolactam/hexamethylenediammonium adipate/hexamethylenediammonium sebacate copolymer (nylon 66/610),
ethyleneammonium adipate/hexamethylenediammonium adipate/hexamethylenediammonium sebacate copolymer (nylon 6/66/610),
polyhexamethyleneisophthalamide,
polyhexamethyleneterephthalamide,
hexamethyleneisophthalmide/terephthalamide copolymer, and so on.

Among such polyamide resins as modified with an aromatic amine such as methylenebenzylamine, m-xylenediamine or the like, those resins having melting points not higher than 160° C. can also be used.

The method of adjusting the melting point of a polyamide resin to a temperature not exceeding 160° C. is not particularly restricted. However, it is industrially preferable to use, among said polyamide resins, copolymer resins having certain comonomer ratios, such as nylon 6/12, nylon 6/69, nylon 6/66/610, nylon 6/66/610/12, nylon 6/66/610/11 etc. and the corresponding aromatic amine-modified copolymers. Specific commercial products include "Amilan CM4000", "Amilan CM8000", "Amilan CM6541×3", "Amilan CM831" and "Amilan CM833", all of which are products of Toray Co., Ltd.;

"Ervamide 8061", "Ervamide 8062S" and "Ervamide 8066", all of which are products of DuPont Japan;

"Grilon CF6S" "Grilon CF62BS", "Grilon CA6E", "Grilon XE3381" and "Grilon BM13SBG", all of which are products of EMS-Japan; and "UBE7128B" and "UBE7028", both of which are products of Ube Industries, Ltd., among others.

The amount of heat of fusion ΔH of the polyamide resin (B) as determined with a differential scanning calorimeter (temperature-raising speed 10° C./min) is preferably not more than 80 J/g (more preferably 5~70 J/g, particularly 10~60 J/g). If the amount of heat of fusion ΔH exceeds 80 J/g, the low-temperature heat-drawability tends to be decreased.

The melt flow rate (MFR) (210° C., load 2160 g) of the polyamide resin (B) is preferably 1~100 g/10 min (more preferably 5~80 g/10 min, particularly 8~50 g/10 min. If the melt flow rate deviates from the above range, the low-temperature heat-drawability tends to be decreased.

In the present invention, two or more species of said polyamide resin (B) varying in structure, composition, molecular weight (relates to MFR) and molecular weight distribution may be optionally used in combination.

<Boron Compound (C)>

The boron compound (C) which can be used in the invention includes boric acid, calcium borate, cobalt borate, zinc borate (zinc tetraborate, zinc metaborate, etc.), aluminum potassium borate, ammonium borate (ammonium metaborate, ammonium tetraborate, ammonium pentaborate, ammonium octaborate, etc.), cadmium borate (cadmium orthoborate, cadmium tetraborate, etc.), potassium borate (potassium metaborate, potassium tetraborate, potassium pentaborate, potassium hexaborate, potassium octaborate, etc.), silver borate (silver metaborate, silver tetraborate, etc.), copper borate (cupric borate, copper metaborate, copper tetraborate, etc.), sodium borate (sodium metaborate, sodium diborate, sodium tetraborate, sodium pentaborate, sodium hexaborate, sodium octaborate, etc.), lead borate (lead metaborate, lead hexaborate, etc.), nickel borate (nickel orthoborate, nickel diborate, nickel tetraborate, nickel octaborate, etc.), barium borate (barium orthoborate, barium metaborate, barium diborate, barium tetraborate, etc.), bismuth borate, magnesium borate (magnesium orthoborate, magnesium diborate, magnesium metaborate, trimagnesium tetraborate, pentamagnesium tetraborate, etc.), manganese borate (manganese borate, manganese metaborate, manganese tetraborate, etc.), and lithium borate (lithium metaborate, lithium tetraborate, lithium pentaborate, etc.), among others. Furthermore, borate minerals such as borax, cahnite, inyoite, kotoite, suanite, azaibelyite, etc. can also be mentioned.

The preferred, among these, are borax, boric acid and sodium borate (sodium metaborate, sodium diborate, sodium tetraborate, sodium pentaborate, sodium hexaborate, sodium octaborate, etc.).

The mechanism of action of the invention is not definitely clear but it is suspected that the boron compound (C) acts on the functional group (OH) of EVOH (A) and the functional group (amide group) of polyamide resin (B) to suppress the thermal degradation associated with interaction of the two resins (A) and (B) and, at the same time, contribute somewhat to their interaction with the thermoplastic resin in the adjoining layer, with the result that both long-run melt-moldability and low-temperature heat-drawability are improved. It is apparent from the comparison of examples of the invention with comparative examples which is made hereinafter that the boron compound (C) contributes to both long-run melt-moldability and heat-drawability.

<Formulating Ratio of (A), (B) and (C) Components>

The formulating ratio of components (A), (B) and (C) in the composition is not particularly restricted but the A/B ratio of EVOH (A) to polyamide resin (B) is preferably 50/50~99/1 (more preferably 60/40~97/3, particularly 70/30~95/5) by weight. If this weight ratio is smaller than 50/50, the gas barrier properties will be insufficient. On the other hand, if the ratio exceeds 99/1, the low-temperature heat-drawability and appearance tend to be inadequate.

Based on 100 weight parts of the EVOH (A) and polyamide resin (B) combined, the boron compound (C) is preferably formulated in a proportion of 0.001~1 weight part (more preferably 0.002~0.5 wt. part, particularly 0.005~0.2 wt. part) as B. If the proportion is less than 0.001 weight part, the long-run melt-moldability and heat-drawability will be insufficient. On the other hand, if the proportion exceeds 1 weight part, the appearance of the shaped article will be adversely affected.

<Formulating Procedure>

The resin composition comprising the above-described components (A), (B) and (C) according to the invention can be simply obtained by blending said components (A), (B) and (C), specifically by any of the following methods.

(1) The components (A), (B) and (C) are blended all at once and, then, melt-kneaded.

(2) The component (A) is blended with the component (B), the component (C) is then added, and the whole mixture is melt-kneaded.

(3) The component (C) is incorporated in the component (A), then the component (B) is added, and the whole mixture is melt-kneaded.

(4) The component (C) is incorporated in the component (B), then the component (A) is added, and the whole mixture is melt-kneaded.

(5) The component (C) is incorporated in both the components (A) and (B), which are then melt-kneaded together.

(6) Each of the components (A), (B) and (C) is dissolved homogeneously in a solvent, the solutions are mixed, and the solvent is removed.

Among these methods, the method (3) is preferred and, therefore, will be described in further detail.

The boron compound (C) can be incorporated in EVOH (A) by contacting the EVOH (A) with an aqueous solution of the boron compound (C). The concentration of boron compound (C) in the aqueous solution is preferably 0.001~1 weight % (more preferably 0.005~0.8 weight %, particularly 0.01~0.5 weight %) as B. If it is less than 0.001 weight %, the necessary amount of boron compound (C) may not be easily incorporated. On the other hand, if it exceeds 1 weight %, the appearance of the shaped article as the end product tends to be inadequate.

The method of contacting EVOH (A) with said aqueous solution of boron compound (C) is not particularly restricted but the method which comprises adding pellets of EVOH (A) to the aqueous solution and stirring the mixture can be generally employed and, in this manner, the boron compound (C) can be successfully incorporated in the pellets of EVOH (A).

Referring to the preparation (molding) of said EVOH (A) pellets, the known technology can be utilized. A typical procedure comprises extruding a solution of EVOH (A) in water-alcohol in the form of a strand or sheet in a coagulation bath and cutting the coagulated strand or sheet into pellets. The preferred shape of the EVOH (A) pellet is a cylinder or a sphere. The cylinder is preferably 1~10 mm in diameter and 1~10 mm long, and the sphere is preferably 1~10 mm in diameter.

In order that the boron compound (C) may be uniformly incorporated, the EVOH (A) obtained by the above coagulation procedure preferably has a microporous internal structure with a multiplicity of pores as fine as about 0.1~10 $\mu$m in diameter uniformly distributed and an EVOH (A) having such an internal structure can be generally obtained by controlling the conditions of extrusion of the EVOH solution (e.g. in water-alcohol) in a coagulation bath, such as the concentration of said EVOH solution (20~80 weight %) extrusion temperature (45~70° C.), type of solvent (water/alcohol=80/20~5/95, by weight), coagulation bath temperature (1~20° C.), residence time (0.25~30 hours) and the level of EVOH in the coagulation bath (0.02~2 weight %), among other parameters.

Moreover, the water content of said pellets of EVOH (A) is preferably 20~80 weight %, for the boron compound (C) can then be uniformly and rapidly incorporated.

The method of adjusting the level of boroncompound (C) relative to EVOH (A) is not particularly restricted. However, this can be achieved by controlling the conditions of contact of EVOH (A) with the aqueous solution of boron compound (C), such as the concentration of the aqueous solution of boron compound (C), duration of contact, contact temperature, rate of agitation in contacting, and the water content of the EVOH (A) to be treated, among other parameters.

The hydrous EVOH (A) pellets containing the boron compound (C) can thus be obtained and the pellets so obtained are generally dried.

This drying can be effected by various methods. For example, the fluidized drying method in which a drying load in pellet form is agitated and dispersed substantially by a mechanical means or by means of a hot air current and the stationary drying method in which pellets are dehydrated substantially without being subjected to a dynamic action such as stirring or dispersing can be mentioned. The dryer which can be used for fluidized drying includes the cylinder-channel type stirring dryer, cylindrical dryer, rotary dryer, fluidized-bed dryer, vibratory fluidized-bed dryer and conical rotary dryer, among others. As regards the dryer which can be used for stationary drying, there can be mentioned the box-type batch dryer which is of the load-stationary type and the band dryer, tunnel dryer, vertical dryer and the like, all of which are of the load-moving type. It should be understood that these dryers are not exclusive choices. Moreover, fluidized drying and stationary drying can be carried out in combination.

The warm or hot gas to be used for said drying includes air and inert gases (nitrogen gas, helium gas, argon gas, etc.). The drying gas temperature is preferably 40~150° C. from the productivity point of view and in terms of the prevention of thermal degradation of the resin composition.

The drying time depends on the water content of the pellet and the treating load size but a drying time of about 15 minutes~72 hours is preferred from the productivity point of view and in terms of the prevention of thermal degradation of the resin composition.

While drying under the above conditions yields the objective boron compound (C)-containing EVOH (A) pellets, it is preferable to insure that the water-content of the pellets so dried will be 0.001~5 weight % (more preferably 0.01~2 weight %, particularly 0.1~1 weight part). If the water content is less than 0.001 weight %, the long-run moldability of the final resin composition of the invention will tend to be poor. On the other hand, if the water content exceeds 5 weight %, foaming tends to take place in the course of melt-kneading with polyamide resin (B) to be described below.

The boron compound (C)-containing EVOH (A) pellets thus obtained are then melt-kneaded with the polyamide resin (B). The method for this melt-kneading is not particularly restricted insofar as the boron compound (C)-containing EVOH (A) can be thoroughly melt-blended with the polyamide resin (B). Thus, any of the known pertinent techniques can be utilized. For example, the known kneading equipment such as Kneader-Ruder, an extruder, a mixing roll, a Banbury mixer, a plastmill, or the like can be employed. Usually, it is advisable to carry out the melt-kneading at 150~300° C. (especially 180~280° C.) for about 1 minute 1 hour. Industrially, an extruder such as a single-screw extruder or a twin-screw extruder is used with advantage and, where necessary, the extruder is preferably quipped with a vent suction means, a gear pump, a screen and/or other devices.

A high-quality resin composition with reduced thermal discoloration or degradation can be obtained by providing the extruder with one or more vent holes for application of suction forces to remove moisture and byproducts (low molecular products of thermal degradation etc.) and/or feeding an inert gas such as nitrogen gas continuously into a hopper to prevent infiltration of oxygen into the extruder.

The melt-kneading of the boron compound (C)-containing EVOH (A) with the polyamide resin (B) can be carried out by the following alternative methods, among others.

1) The method in which the boron compound (C)-containing EVOH (A) in solid form and the polyamide resin (B) are blended all at once and melt-kneaded.
2) The method in which the polyamide resin (B) in solid form is added to a molten mass of the boron compound (C)-containing EVOH (A) and the mixture is melt-kneaded.
3) The method in which the boron compound (C)-containing EVOH (A) in solid form is added to a molten mass of the polyamide resin (B) and the mixture is melt-kneaded.
4) The method in which the boron compound (C)-containing EVOH (A) and the polyamide resin (B), both in molten state, are blended and melt-kneaded.

<Other Additives>

While the resin composition comprising said components (A), (B) and (C) according to the invention can be prepared by the above procedure, it is a recommendable procedure, for improving the thermal stability of the resin composition, long-run moldability, adhesion to the adhesive resin layer of a laminate, and heat-drawability to supplement the composition with an acid, such as acetic acid, phosphoric acid or the like, and/or a salt of the acid with a metal such as an alkali metal, alkaline earth metal, transition metal or the like. Incorporation of an alkali metal or alkaline earth metal salt is particularly effective.

The metal salt mentioned above includes salts of organic acids (acetic acid, propionic acid, butyric acid, lauric acid, stearic acid, oleic acid, behenic acid, etc.) with said metals and salts of inorganic acids (phosphoric acid, sulfuric acid, sulfurous acid, carbonic acid, etc.) with said metals (e.g. sodium salt, potassium salt, calcium salt, magnesium salt, etc.). Among these, acetates, phosphates and hydrogen phosphates are particularly suitable.

While the metal salt is formulated as needed in the resin composition described above, the concentration of the metal salt is preferably 5~1000 ppm (more preferably 10~500 ppm, particularly 20~300 ppm) as the metal relative to the resin composition. If the level of addition of the metal salt is less than 5 ppm, the effect of addition will not be sufficiently expressed. On the other hand, if the level exceeds 1000 ppm, the appearance of the shaped article will be unacceptably affected. When the resin composition contains two or more kinds of alkali metal and/or alkaline earth metal salts, the total of such salts is preferably within the above-mentioned range.

The technology of incorporating an acid or a metal salt thereof in the resin composition includes the method which comprises incorporating the acid or metal salt in EVOH (A) (when 2 or more EVOH species are used, at least one of them) in advance, the method which comprises incorporating the acid or metal salt in a composition prepared by blending EVOH (A) with polyamide resin (B), and the method representing a combination of the above two methods. In order to obtain a more prominent expression of the effect of the invention, the method comprising incorporating the acid or metal salt in EVOH in advance is preferred in view of the better dispersibility of the acid or metal salt.

The method which comprises incorporating the acid or metal salt in EVOH (A) in advance includes:

(a) the technique which comprises contacting a porous precipitate of EVOH having a water content of 20~80 weight % with an aqueous solution of the acid or metal salt and drying the resulting acid- or metal salt-incorporated EVOH;

(b) the technique which comprises adding the acid or metal salt in a homogeneous solution of EVOH (in water or alcohol), extruding the mixture in a strand form in a coagulation bath, cutting the strand into pellets and drying the pellets;

(c) the technique which comprises blending EVOH with the acid or metal salt and melt-kneading the resulting batch by means of an extruder or the like;

(d) the technique which comprises, in the course of preparation of EVOH, neutralizing the alkali (sodium hydroxide, potassium hydroxide or the like), used in the saponification step, with acetic acid or the like and washing the EVOH with water to adjust the amounts of residual acetic or other acid and byproduct alkali metal salt, such as sodium acetate, potassium acetate or the like, among other techniques.

For a more prominent expression of the effect of the invention, the above technique (a), (b) or (d) is preferred in view of the better dispersibility of the acid or metal salt thereof.

Furthermore, within limits not contrary to the object of the invention, the resin composition of the invention may be supplemented with the following ingredients:

lubricants such as saturated aliphatic amides (e.g. stearamide), unsaturated fatty acid amides (e.g. oleamide), bis-fatty acid amides (ethylene-bis-stearamide), fatty acid metal salts (e.g. calcium stearate, magnesium stearate, zinc stearate), low-molecular polyolefins (e.g. polyethylene or polypropylene of low molecular weight, i.e. about 500~10000), etc.;

inorganic salts (e.g. hydrotalcite), plasticizers (e.g. aliphatic polyhydric alcohols such as ethylene glycol, glycerol, hexanediol, etc.), oxygen absorbers [e.g. inorganic oxygen absorbers such as reducing iron powder, either as it is or in admixture with a water-absorbing substance, an electrolyte and/or other additive, aluminum powder, potassium sulfite, photocatalyst titanium oxide, etc.; organic oxygen absorbers such as ascorbic acid, its fatty acid esters and metal salts, hydroquinone, gallic acid, polyphenols such as hydroxyl-containing phenol-aldehyde resin, etc., bis-salicylaldehydeimine cobalt, tetraethylenepentamine cobalt, cobalt-Schiff's base complex, porphyrines, macrocyclic polyamine complex, polyethyleneimine-cobalt complex and other coordination products of nitrogen-containing compounds with transition metals, terpene compounds, reaction products of amino acids with hydroxyl-containing reducing substances, triphenylmethyl compounds, etc.; polymer series oxygen absorbers such as coordination products of nitrogen-containing resins with transition metals (e.g. MXD nylon-cobalt complex) blends of tertiary hydrogen-containing resins with transition metals (e.g. polypropylene-cobalt blend), blends of carbon-carbon unsaturated bond-containing resins with transition metals (e.g. polybutadiene-cobalt blend), photooxidation-degradable resins (e.g. polyketones), anthraquinone polymers (e.g. polyvinylanthraquinone), and such formulations supplemented with aphotoinitiator (e.g. benzophenone), a peroxide acceptor (e.g. a commercial antioxidant) and/or a deodorizer (e.g. activated carbon), among others].

In addition, there may also be formulated various heat stabilizers, light stabilizers, oxidation inhibitors, ultraviolet absorbers, colorants, antistatic agents, surfactants, antimicrobial agents, antiblocking agents (e.g. finely divided talc), slip agents (e.g. amorphous silica), fillers (silicon oxide, titanium dioxide, clay, talc, bentonite, water-swellable phyllosilicate, etc.) and other resins (e.g. polyolefins, polyesters, polyamide resins melting at temperatures over 160° C.), among others.

<Laminate>

The resin composition of the invention, thus obtained, is very satisfactory in gas barrier properties, low-temperature heat-drawability, long-run melt-moldability and appearance and can of course be used as a single-layer artifact for various applications. However, it is useful in the form of a laminate.

It is particularly advantageous to use it in the form of a laminate consisting of the particular resin composition layer (X) and, as disposed on at least one side thereof, a thermoplastic resin layer (Y), and such a laminate has good water resistance, mechanical characteristics, heat-sealability and other properties of practical utility. Since such a laminate comprises the resin composition of the invention, it displays very satisfactory functions in terms of gas barrier properties, low-temperature heat-drawability, long-run melt-moldability and appearance. Such laminates are now described in detail.

In manufacturing a laminate, a second material (particularly, a thermoplastic resin) is laminated to one side or both sides of the resin composition of the invention. The laminating technology which can be used includes but is not limited to a method which comprises melt-extruding a second material in superimposition on a film or sheet of the resin composition of the invention, a method which comprises melt-extruding the resin composition of the invention to a second material, a method which comprises co-extruding the resin composition of the invention and a second material, and a method which comprises dry-laminating a layer of the resin composition of the invention and a layer of the second material with the aid of a known adhesive comprising an organotitanium compound, an isocyanate compound, a polyester compound, a polyurethane compound, or the like. The melt-forming temperature for the above melt-extrusion method is frequently selected from the range of 150~300° C.

As said second material, a thermoplastic resin is useful. The thermoplastic resin includes but is not limited to the following:

polyolefin resins in a broad sense of the term, such as linear low-density polyethylene, low-density polyethylene, ultra-low-density polyethylene, medium-density polyethylene, high-density polyethylene, ethylene-vinyl acetate copolymer, ionomers, ethylene-propylene (block or random) copolymer, ethylene-acrylic acid copolymer, ethylene-acrylate ester copolymer, ethylene-methacrylic acid copolymer, ethylene-methacrylate ester copolymer, homo- or copolymers of olefins, e.g. polypropylene, propylene-α-olefin (α-olefin of 4~20 carbon atoms) copolymers, polybutene, polypentene, polymethylpentene, etc., such homo- or copolymers of olfins graft-modified with an unsaturated carboxylic acid or an ester thereof, polyester resins, polyamide resins (inclusive of co-polyamies), polyvinyl chloride, polyvinylidene chloride, acrylic resins, polystyrene resins, vinyl ester resins, polyester elastomers,
polyurethane elastomers,
chlorinated polyethylene
chlorinated polypropylene,
aromatic or aliphatic polyketones and
polyalcohols available on reduction thereof, and
other EVOH species.

The preferred, among these, from the standpoint of characteristics (particularly strength and appearance) or practical utility are polystyrene, polyolefins (e.g. polypropylene, ethylene-propylene (block or random) copolymer, polyethylene, ethylene-vinyl acetate copolymer), polyamides, polyethylene terephthalate (PET) and polyethylene naphthalate (PEN). Particularly preferred is polystyrene which has good rigidity, transparency and surface gloss. Polyolefins which are advantageous from environmental points of view are also desirable.

When a second material is extrusion-coated on a film, sheet or other shaped article made of the resin composition of the invention or a film or sheet of the second material is laminated to the latter with the aid of an adhesive, said second material may be any of said thermoplastic resins and other desired materials (e.g. paper, metal foil, a uni- or biaxially oriented plastic film or sheet either as it is or with an inorganic substance vapor-deposited thereon, woven cloth, nonwoven cloth, metal flocs, wood, etc.).

The laminar structure of the laminate of the invention, when the layer of the resin composition of the invention is designated as X (x, $x_1$, $x_2$, ...), the layer of the second material, such as a thermoplastic resin layer, is designated as Y (y, $y_1$, $y_2$, ...), and the structure is a film, sheet or bottle, for instance, includes not only a binary structure consisting of x/y but also any suitable multi-layer structure such as y/x/y, x/y/x, $x_1$/$x_2$/y, x/$y_1$/$y_2$, $y_2$/$y_1$/x/$y_1$/$y_2$, $y_2$/$y_1$/x/$y_1$/x/$y_1$/$y_2$, among others.

Furthermore, when a regrind layer (a layer formed by crushing a laminate for reuse) comprising a mixture of at least said resin composition and thermoplastic resin is designated as R, the structure may for example be y/R/x, y/R/x/y, y/R/x/R/y, y/x/R/x/y, y/R/x/R/x/R/y.

In the case of a filament, the mode of combination of x and y may be any of bimetal, core(x)-sheath(y), core (y)-sheath (x), offset (eccentric) core-sheath, and other types.

In the above laminar construction, an interlayer adhesive resin layer (AD) may be optionally interposed. As the adhesive resin, a variety of resins can be used. Interposition of the adhesive resin layer (AD) is preferred for obtaining a laminate with good drawability.

The preferred adhesive resin is dependent on the kind of y-layer resin and cannot be stated in general terms but a carboxyl-containing modified olefinic polymer obtainable by coupling an unsaturated carboxylic acid or acid anhydride to an olefinic polymer (said polyolefin resin in a broad sense of the term) chemically by addition reaction or graft reaction can be mentioned as a typical example. Specifically, it can be a polymer selected from among maleic anhydride graft-modified polyethylene, maleic anhydride graft-modified polypropylene, maleic anhydride graft-modified ethylene-propylene (block or random) copolymer, maleic anhydride graft-modified ethylene-ethyl acrylate copolymer, maleic anhydride graft-modified ethylene-vinyl acetate copolymer and the like. These may be used independently or two or more of them may be used in combination.

The amount of said unsaturated carboxylic acid or acid anhydride in the thermoplastic resin is preferably 0.001~3 weight %, more preferably 0.01~1 weight %, particularly 0.03~0.5 weight %. When the degree of modification of said modified polymer is too small, adhesion tends to be insufficient. On the other hand, when the degree of modification is too high, a crosslinking reaction may be induced to adversely affect moldability.

Furthermore, these adhesive resins may be blended with the resin composition of the invention, other EVOH species, rubber/elastomer components such as polyisobutylene, ethylene-propylene rubber, etc. and even the Y-layer resin. Particularly, blending a polyolefin resin different from the polyolefin-resin constituting the basis of the adhesive resin may result in improved adhesion.

The thickness of each layer as a component of the laminate is dependent on the overall laminar structure, kind of Y, end use or bottle shape, required physical properties, etc. and cannot be stated in general terms but is usually selected from the range of about 5~500 μm (especially 10~200 μm) for the X-layer, about 10~5000 μm (especially 30~1000 μm) for the Y-layer, and about 5~400 μm (especially 10~150 μm) for the adhesive AD layer. If the X-layer is less than 5 μm thick, not only will the gas barrier properties be inadequate but thickness control will become unsteady. On the other hand, if the thickness exceeds 500 μm, the impact resistance will become insufficient and an economic disadvantage will result. If the Y-layer is less than 10 μm thick, the rigidity will be insufficient. On the other hand, if the thickness of the Y-layer exceeds 5000 μm, the weight will be increased and the cost burden will be great. If the thickness of the adhesive resin (AD) layer is less than 5 μm, not only will the interlayer adhesion be insufficient but thickness control will become unsteady. On the other hand, if the thickness of the (AD) layer exceeds 400 μm, the weight will become excessive and an economic disadvantage will be inevitable.

The particularly preferred laminar structure for vessels includes

1. "polystyrene resin layer (Y1)/adhesive resin layer (AD)/ resin composition layer (X)/adhesive resin layer (AD)/ polystyrene resin layer (Y1)"
2. "polyolefin resin layer (Y2)/adhesive resin layer (AD)/ resin composition layer (X)/adhesive resin layer (AD)/ polystyrene resin layer (Y1)"
3. "polyolefin resin layer (Y2)/adhesive resin layer (AD)/ resin composition layer (X)/adhesive resin layer (AD)/ polyolefin resin layer (Y2)

In the above structure 1, a polystyrene resin layer (Y1) with good rigidity, transparency and surface gloss is disposed as two outermost layers constituting the inside and outside walls of a vessel.

In the above structure 2, preferably a polyolefin resin layer (Y2) (particularly a polyethylene resin layer) with good heat-sealability is disposed as the outermost layer constituting the inside surface of a vessel and a polystyrene resin layer (Y1) with good rigidity, transparency and surface gloss is disposed as the outermost layer constituting the outside surface of the vessel.

In the above structure 3, a polyolefin resin layer (Y2) (particularly a polyethylene resin layer) is disposed as the outermost layer constituting the inside wall of a vessel and a polyolefin resin layer (Y1) (particularly a polypropylene resin layer or a polyethylene resin layer) is disposed as the outermost layer constituting the outside wall of the vessel. This structure (3) is useful for applications where the use of polystyrene resin is restricted for environmental reasons.

<Heat-drawing>

The above laminate can be used as such in various forms but since the resin composition of the invention has good gas barrier properties, low-temperature heat-drawability, long-run melt-moldability and appearance as mentioned above, it is also a good practice to subject it to thermal stretching for the purpose of improving its physical properties or forming it into vessels having desired shapes with greater success.

The term "heat-drawing" as used herein means an operation in which a uniformly heated laminate in the form of a film, sheet or parison is uniformly molded into a cup, tray, tube, bottle, film or the like by chuck, plug, vacuum, compressed air, blow, or other means. The drawing may be whichever of uniaxial and biaxial stretching, and it is advisable to carry out the stretching at as high a draw ratio as possible, for a drawn article with good gas barrier properties can then be obtained without troubles such as the incidence of pinholes and cracks during stretching, uneven stretching, irregular section, or delamination.

The stretching technology which can be used includes various methods providing for high draw ratios as selected from among roller stretching, tentering, tubular extrusion stretching, stretch blowing, vacuum forming, air pressure forming, and vacuum/air pressure forming. In the case of biaxial stretching, whichever of the concurrent biaxial stretching technique and the sequential biaxial stretching technique can be used. For the production of vessels such as cups and trays, draw-molding techniques such as vacuum forming, air pressure forming, vacuum-air pressure forming and plug-assisted vacuum-air pressure forming are important. In such processes, a uniformly heated multi-layer sheet is drawn into vessels, such as cups and trays, by chuck, plug, vacuum, air-pressure or other means.

The drawing temperature is selected from the range of about 60~170° C., preferably about 80~160° C., more preferably about 100~140° C. The lower the drawing temperature is, the higher is productivity and, therefore, it is preferable to select as low a temperature as possible for heat-drawing.

After drawing, it is good practice to carry out heat setting. The heat setting can be made by the well-known technology. Thus, with the stretched film held under tension, it is heat-set at 80~170° C., preferably 100~160° C., for about 2~600 seconds.

When the laminate is to be used for shrink-packaging of raw meat, processed meat, cheese or the like, the stretched film is not heat-set but used as it is. Thus, said raw meat, processed meat, cheese or the like is accommodated in said film and heated at 50~130° C., preferably 70~120° C., for about 2~300 seconds to cause the film to shrink into intimate contact with the food.

The shape of the laminate is not particularly restricted but includes film, sheet, tape, cup, tray, tubing, bottle, piping, filament and profile shapes, to mention just a few examples. Where necessary, the laminate may be subjected to heat treatment, cooling, rolling, printing, dry lamination, solution or melt coating, bag-making, deep drawing, box-making, tube formation, splitting and other treatments.

When the heat-drawing is draw molding, among them, the draw ratio for a multi-lamellar vessel is preferably in the range of 4~20. With a draw ratio of less than 4, only shallow vessels can be fabricated which cannot be substituted for metal cans for beverages, thus being limited in applicability. On the other hand, with a draw ratio in excess of 20, a local variation in section and breaks tend to take place on the lateral part of the multi-lammelar vessel, thus detracting from the marketability of the product. The preferred range of draw ratio is 4~15, the more preferred range is 5~10, and the most preferred range is 6~10.

The term "draw ratio" is used herein to mean the ratio of $S_1/S_0$ where $S_0$ is the area of a sheet to be heat-stretched and $S_1$ is the area of the sheet which has been heat-stretched. Taking a cup-shaped vessel as an example, the surface area of the cup top corresponds to $S_0$ and the sum of the surface area of the lateral side and that of the cup bottom corresponds to $S_1$.

The above vessel, e.g. cup, tray, tube or bottle, and the bag, cover or the like made of the drawn film, obtained as described above, are of use as containers for general foods, condiments, fermented foods, oleaginous foods, beverages, cosmetic products, pharmaceutical products, detergents, perfumes, fragrances and other aromatic products, industrial chemicals, agrochemicals, fuels and other products.

Particularly when the heat-drawn multi-lamellar vessel of the invention is a cup-shaped one, it is of use as a container for semisolid foods or condiments, e.g. jellies, puddings, yogurt, mayonnaise, miso, etc. and liquid beverages or condiments, e.g. salad oil, mirin, refined sake, beer, wine, juices, black tea, sport drinks, mineral water, milk, yogurt drinks and so forth.

When the heat-drawn multi-lamellar vessel of the invention is a tray-shaped one, it can be used with advantage as a tray for raw meat or processed animal meat products (ham, bacon, Vienna sausages, etc.).

EXAMPLES

The following examples illustrate the present invention in further detail.

In the following description, all parts and % are by weight unless otherwise indicated. The unit of MFR is g/10 min (measured at 210° C. under a load of 2160 g)

<Methods for Determinations>

The melting point of polyamide resin was determined by using a differential scanning calorimeter (DSC-7, product of Perkin-Elmer Co.) at a temperature increase rate of 10° C./min.

The boric acid content of EVOH was determined by melting EVOH with an alkali and quantitating boron by ICP emission spectral analysis.

The alkali metal content was determined by calcifying and, then, dissolving EVOH in an aqueous solution of hydrogen chloride and quantitating the alkali metal by atomic absorption spectrometry.

Example 1

A solution of an EVOH having an ethylene content of 34 mole %, a saponification degree of 99.5 mole % and an MFR value of 20 in water-methanol (40/60 by weight) (60° C., EVOH concentration 45%) was extruded as a strand in a coagulation water bath controlled at 5° C. and the resulting strand was pelletized with a cutter to give porous pellets of EVOH (A) having a diameter of 4 mm and a length of 4 mm.

The porous pellets of EVOH (A) were rinsed with water, placed in an aqueous medium containing 0.3% of boric acid (C) and 0.1% of sodium acetate, and stirred at 35° C. for about 4 hours. The treated pellets were then dried with a batch fluidized-bed column dryer at 75° C. for 3 hours and further with a batch air-circulating box dryer at 125° C. for 18 hours to give an EVOH composition (pellets) containing 0.03 part as B of boric acid (C) and 120 ppm as Na of sodium acetate per 100 parts of EVOH.

As the polyamide resin (B), a nylon 6/12 copolymer (Grilon CF6S, product of EMS-Japan; density 1.05 g/cm$^3$, melting point 133° C., ΔH 51 J/g, MFR 18) was provided.

Using a twin-screw extruder, 90 parts of the above EVOH composition (A+C) and 10 parts of the above polyamide resin (B) were melt-kneaded to give a resin composition of the invention.

<Melt-pelletization Conditions with a Twin-screw Extruder>

| | |
|---|---|
| Screw in. dia. | 30 mm (L/D = 30) |
| Screw geometry | Equipped with a 100 mm kneading disk in the compression zone |
| Screen mesh size | 90/90 mesh |
| Screw RPM | 150 rpm |
| Vent holes | Vacuum suction |
| Hopper | N$_2$ gas purging |
| Extrusion temperature | C1: 190° C. |
| | C2: 200° C. |
| | C3: 210° C. |
| | C4: 220° C. |
| | C5: 220° C. |
| | AD: 210° C. |
| | D: 210° C. |

Using the resin composition prepared above, laminate cups were fabricated by melt-molding and heat-drawing and evaluated for gas barrier properties, low-temperature heat-drawability and long-run melt-moldability.

<Fabrication of Laminates (cups)>

As the polystyrene resin, Diarex HT516 manufactured by A & M Styrene Co. and, as the adhesive resin, Modic AP F502 manufactured by Mitsubishi Chemical Co. were respectively provided.

The resin composition obtained as above was fed to a multi-layer extruder equipped with a 3-kind/5-layer feed-block multi-layer T-die to give a multi-lamellar sheet of the "polystyrene layer/adhesive resin layer/resin composition layer/adhesive layer/polystyrene layer" construction, the thicknesses of the constituent layers being 480/60/120/60/480 μm in that order.

Using a plug-assisted vacuum-pressure forming machine (manufactured by Asano Research Institute), the above multi-lamellar sheet was heat-drawn into cups (top 65 mmΦ, bottom 60 mmΦ, depth 55 mm or 107 mm) at a heater temperature of 500° C. and a sheet surface temperature of 125° C. or 130° C. to provide the following 4 kinds of laminates (cups). The sheet surface temperature was controlled by adjusting the heating time setting of the heater.

Heat-drawing at a sheet surface temperature of 125° C.
Depth of cup: 55 mm (draw ratio: 4.1)
Depth of cup: 107 mm (draw ratio: 7.2)
Heat-drawing at a sheet surface temperature of 130° C.
Depth of cup: 55 mm (draw ratio: 4.1)
Depth of cup: 107 mm (draw ratio: 7.2)

The above laminates (cups) were evaluated for appearance, gas barrier properties and long-run melt-moldability by the following methods.

(Appearance)

The cups obtained as above were macroscopically examined and rated according to the following evaluation schedule.

◎: Neither cracks nor pinholes found; no local variation in section was observed, either.

○: Some local variation in section in the lateral part of the cup

Δ: Marked local variation in section in the lateral part of the cup

X: Not only marked local variation in section but several breaks in the lateral part of the cup (Gas Barrier Properties)

The top opening of each cup obtained as above was hermetically closed with an aluminum sheet and using "OXTRAN 10/50" manufactured by Modern Control Co., the oxygen permeability was measured under the following conditions.

Inside of the cup: 23° C., 100% RH
Outside of the cup: 23° C., 50% RH (Long-run Melt-moldability)

The multi-lamellar sheet production described above was performed for 24 consecutive hours and the sheet was heat-drawn in the same manner as above. The resulting cup was evaluated for appearance according to the same criteria as above.

Example 2

The procedure of Example 1 was repeated except that an EVOH composition (pellets) was prepared using an EVOH (A) with an ethylene content of 29 mole %, a saponification degree of 99.6 mole % and an MFR value of 15, 0.02 part as B of boric acid (C) and 100 ppm as Na of sodium acetate and that the blending ratio of EVOH composition (A+C)/polyamide resin (B) was set to 85 parts/15 parts.

Example 3

The procedure of Example 1 was repeated except that an EVOH composition (pellets) was prepared using an EVOH (A) with an ethylene content of 29 mole %, a saponification degree of 99.6 mole % and an MFR value of 15 and 0.02 part as B of boric acid (C) and that the blending ratio of the EVOH composition (A+C)/polyamide resin (B) was set to 85 parts/15 parts.

Example 4

The procedure of Example 1 was repeated except that an EVOH composition (pellets) was prepared using an EVOH (A) with an ethylene content of 38 mole %, a saponification degree of 99.5 mole % and an MFR value of 35, 0.04 part as B of boric acid (C) and 200 ppm as Na of sodium acetate and that the blending ratio of EVOH composition (A+C)/polyamide resin (B) was set to 94 parts/6 parts.

Example 5

The procedure of Example 1 was repeated except that, as the polyamide resin (B), the nylon 6/66/610/12 copolymer (Amilan CM8000, product of Toray Co.; density 1.12 g/cm$^3$, melting point 131° C., ΔH 40 J/g, MFR 25) was used.

Example 6

The procedure of Example 1 was repeated except that, as the polyamide resin (B), the nylon 6/12 copolymer (Grilon CA6E, product of EMS-Japan Co.; density 1.06 g/cm$^3$, melting point 124° C., ΔH 39 J/g, MFR 26) was used.

Example 7

The procedure of Example 1 was repeated except that, as the polyamide resin (B), the nylon 6/12 copolymer (Amilan CM 6541-X3, product of Toray Co.; density 1.11 g/cm³, melting point 135° C., ΔH 40 J/g, MFR 12). was used.

Example 8

The procedure of Example 1 was repeated except that as the laminar construction of the multi-lamellar sheet, the polystyrene (Diarex HT516, product of A & M Styrene Co.) layer/adhesive resin (Modic AP F502, product of Mitsubishi Chemical Co.) layer/resin composition layer/adhesive resin (same as above) layer/poly-ethylene (Novatec LD YF 30, product of Polychem Japan) layer (thicknesses: 990/30/60/30/200 μm in the order mentioned); provided, however, that the polyethylene layer was disposed to constitute the inside wall of the cup.

Example 9

The procedure of Example 1 (4) was repeated except that as the laminar construction of the multi-lamellar sheet, the polystyrene resin layer/adhesive resin layer/resin composition layer/adhesive resin layer/polyethylene resin layer was used.

Example 10

The procedure of Example 1 (6) was repeated except that a polypropylene resin layer was used in lieu of the polystyrene resin layer and that as the laminar construction of the multi-lamellar sheet, the polypropylene resin (Novatec PP EG7F, product of Polychem Japan) layer/adhesive resin layer/resin composition layer/adhesive resin layer/polyethylene resin layer structure was used; provided that the polyethylene resin layer constituted the inside wall of the cup.

Comparative Example 1

The procedure of Example 1 was repeated except that the polyamide resin (B) was not formulated in the resin composition.

Comparative Example 2

The procedure of Example 1 was repeated except that boric acid (C) was not formulated in the resin composition.

Comparative Example 3

The procedure of Example 1 was repeated except that, as the polyamide resin (B), the nylon 6/12 copolymer (Amilan CM6541-X4, product of Toray Co.; density 1.10 g/cm³, melting point 196° C.) was used.

The results of evaluations in the above Examples 1~10 and Comparative Examples 1~3 are collectively presented in Table 1 and Table 2.

The unit of gas barrier properties is "cc/day·air" per cup.

In the tables, "–" means that the item was "not measured" because it was obvious that breaks occurring in the cup would lead to an overestimation of oxygen permeability.

TABLE 1

Heat-drawing at a sheet surface temperature of 125° C.

| | 55 mm-deep cup | | | 107 mm-deep cup | | |
|---|---|---|---|---|---|---|
| | Appearance | Gas barrier properties | Long-run moldability | Appearance | Gas barrier properties | Long-run moldability |
| Example 1 | ⊚ | 0.0026 | ⊚ | ⊚ | 0.0078 | ⊚ |
| Example 2 | ⊚ | 0.0021 | ⊚ | ⊚ | 0.0061 | ⊚ |
| Example 3 | ⊚ | 0.0022 | ⊚ | ⊚ | 0.0063 | ○ |
| Example 4 | ⊚ | 0.0041 | ⊚ | ⊚ | 0.0072 | ⊚ |
| Example 5 | ⊚ | 0.0033 | ⊚ | ⊚ | 0.0084 | ⊚ |
| Example 6 | ⊚ | 0.0030 | ⊚ | ⊚ | 0.0081 | ⊚ |
| Example 7 | ⊚ | 0.0027 | ⊚ | ⊚ | 0.0079 | ⊚ |
| Example 8 | ⊚ | 0.0053 | ⊚ | ⊚ | 0.0165 | ⊚ |
| Example 9 | ⊚ | 0.0043 | ⊚ | ⊚ | 0.0125 | ⊚ |
| Example 10 | ⊚ | 0.0029 | ⊚ | ⊚ | 0.0093 | ⊚ |
| Comparative Example 1 | x | — | x | x | — | x |
| Comparative Example 2 | ⊚ | 0.0025 | x | Δ | 0.0079 | x |
| Comparative Example 3 | Δ | — | x | x | — | x |

TABLE 2

Heat-drawing at a sheet surface temperature of 130° C.

| | 55 mm-deep cup | | | 107 mm-deep cup | | |
|---|---|---|---|---|---|---|
| | Appearance | Gas barrier properties | Long-run moldability | Appearance | Gas barrier properties | Long-run moldability |
| Example 1 | ⊚ | 0.0026 | ⊚ | ⊚ | 0.0077 | ⊚ |
| Example 2 | ⊚ | 0.0020 | ⊚ | ⊚ | 0.0061 | ⊚ |
| Example 3 | ⊚ | 0.0023 | ○ | ⊚ | 0.0063 | ○ |
| Example 4 | ⊚ | 0.0041 | ⊚ | ⊚ | 0.0074 | ⊚ |
| Example 5 | ⊚ | 0.0031 | ⊚ | ⊚ | 0.0084 | ⊚ |
| Example 6 | ⊚ | 0.0029 | ⊚ | ⊚ | 0.0083 | ⊚ |
| Example 7 | ⊚ | 0.0028 | ⊚ | ⊚ | 0.0079 | ⊚ |
| Example 8 | ⊚ | 0.0062 | ⊚ | ⊚ | 0.0177 | ⊚ |
| Example 9 | ⊚ | 0.0031 | ⊚ | ⊚ | 0.0251 | ⊚ |
| Example 10 | ⊚ | 0.0061 | ⊚ | ⊚ | 0.0090 | ⊚ |
| Comparative Example 1 | x | — | x | x | — | x |
| Comparative Example 2 | ⊚ | 0.0025 | Δ | ○ | 0.0080 | x |
| Comparative Example 3 | x | — | Δ | x | — | x |

Example 11

Ninety (90) parts of an EVOH composition (A+C) comprising an EVOH (A) having an ethylene content of 34 mole %, a saponification degree of 99.5 mole % and an MFR value of 3.5 and supplemented with 0.03% as B of boric acid (C) and 120 ppm as Na of sodium acetate and 10 parts of a polyamide resin (nylon 6/12 copolymer, Grilon CF6S, product of EMS-Japan; density 1.05 g/cm³, melting point 133° C., ΔH 51 J/g, and MFR 18) (B) were melt-kneaded together under the same conditions as in Example 1 to give a resin composition in the pellet form.

However, the incorporation of boric acid (C) and sodium acetate in EVOH (A) was carried out by the method comprising extruding a solution of EVOH in water-methanol following saponification in the production of EVOH for coagulation in a water tank, cutting the resulting strand into porous pellets, washing the pellets with an aqueous solution of acetic acid, and feeding the washed pellets into an aqueous medium containing boric acid and sodium acetate.

As the polystyrene resin, Diarex HT516 manufactured by A & M Styrene Co. and, as the adhesive resin, Modic AP F502 manufactured by Mitsubishi Chemical Co. were respectively provided.

The above resin composition, polystyrene and adhesive resin were fed to a multi-layer extrusion machine equipped with a multi-layer T die of the 3-kind, 5-layer feedblock type to prepare a multi-lamellar sheet of the "polystyrene layer/ adhesive resin layer/resin composition layer/adhesive resin layer/polystyrene layer structure, the thicknesses of the respective layers being 480/60/120/60/480 μm in the order mentioned.

Using a plug-assisted vacuum-pressure forming machine (manufactured by Asano Research Institute), the above multi-lamellar sheet was heat-drawn into cups (top 64 mmΦ, bottom 60 mmΦ, depth 107 mm, draw ratio 7.4) at a heater temperature of 500° C. and a sheet surface temperature of 125° C. The sheet surface temperature was controlled by adjusting the heating time setting of the heater.

The above heat-drawn multi-lamellar vessel (cup) was evaluated for appearance and gas barrier properties according to the same criteria as in Example 1. The shape of the vessel was also evaluated according to the following criteria.
<Shape Evaluation> o: A deep cup of high marketability as a container for beverages

X: A shallow cup of low marketability with limited potential application

Example 12

The procedure of Example 11 wa repeated except that a resin composition was prepared using an EVOH (A) having an ethylene content of 29 mole %, a saponification degree of 99.5 mole %, an MFR value of 4, a boric acid (C) content of 0.015% as B, and a sodium acetate content of 100 ppm as Na and used to fabricate a multi-lamellar vessel (cup) by heat-drawing and evaluated it. However, the incorporation of boric acid (C) and sodium acetate in EVOH (A) was carried out as follows. Thus, a solution of EVOH in water/ methanol following saponification in the production of EVOH was extruded into a strand form in a coagulation water bath and cut to give a porous precipitate in the pellet form and the pellets were washed with an aqueous solution of acetic acid and stirred in an aqueous medium containing boric acid and sodium acetate.

Example 13

A heat-drawn multi-lamellar vessel (cup) was produced and evaluated in the same manner as in Example 11 except that the vessel shape parameters used were top 100 mm×75 mm, bottom 85 mm×55 mm, depth 110 mm and draw ratio 5.2.

Example 14

A heat-drawn multi-lamellar vessel (cup) was produced and evaluated in the same manner as in Example 11 except that the laminar construction of the multi-layer sheet was polystyrene (Diarex HT516, product of A & M Styrene Co.) layer/adhesive resin (Modic AP F502, product of Mitsubishi Chemical Co.) layer/resin composition layer/adhesive resin (same as above) layer/polyethylene (Novatec LD YF30, product of Polychem Japan) layer (thicknesses: 990/30/60/ 30/200 μm). However, the polyethylene layer was disposed to constitute the inside wall of the cup.

Example 15

A heat-drawn multi-lamellar vessel (cup) was produced and evaluated in the same manner as in Example 11 except that the laminar construction of the multi-lamellar sheet was polyethylene (Novatec LD YF30, product of Polychem Japan) layer/adhesive resin (Modic AP L513, product of Mitsubishi Chemical Co.) layer/resin composition layer/ adhesive resin (same as above) layer/polyethylene (same as above) layer (thicknesses: 240/50/120/60/720 μm).

Example 16

A multi-lamellar vessel (cup) was produced by heat-drawing and evaluated in the same manner as in Example 12 except that the laminar construction of the multi-layer sheet was polypropylene (Novatec PP EG7F, product of Polychem Japan) layer/adhesive resin layer (Modic AP F522, product of Mitsubishi Chemical Co.) layer/resin composition layer/ adhesive resin (same as above) layer/polyethylene (Novatec LD YF30, product of Polychem Japan) layer (thicknesses: 240/60/120/60/720 μm). However, the polyethylene layer was disposed to constitute the inside wall of the cup.

Example 17

A resin composition was prepared and a heat-drawn multi-lamellar vessel (cup) was produced and evaluated in the same manner as in Example 14 except that, as the polyamide resin (B), "Amilan CM 80000 (nylon 6/66/610/ 12 copolymer, density 1.12 g/cm$^3$, melting point 131° C., ΔH 40 J/g, MFR 25), product of Toray Co., was used.

Example 18

A resin composition was prepared and a heat-drawn multi-lamellar vessel (cup) was produced and evaluated in the same manner as in Example 15 except that, as the polyamide resin (B), Grilon CA6E (nylon 6/12 copolymer, density 1.06 g/cm$^3$, melting point 124° C., ΔH 39 J/g, MFR 26), product of EMS-Japan, was used.

Example 19

A resin composition was prepared and a heat-drawn multi-lamellar vessel (cup) was produced and evaluated in the same manner as in Example 16 except that, as the polyamide resin (B), a nylon 6/12 copolymer (Amilan CM6541-X3, product of Toray Co.; density 1.11 g/cm$^3$, melting point 135° C., ΔH 40 J/g, MFR 12) was used.

Comparative Example 4

A heat-drawn multi-lamellar vessel (cup) was produced and evaluated in the same manner as in Example 11 except that the polyamide resin (B) was not formulated.

Comparative Example 5

A resin composition was prepared and a heat-drawn multi-lamellar vessel was produced and evaluated in the same manner as in Example 11 except that, as the polyamide resin (B), a nylon 6/12 copolymer (Amilan CM6541-X4, product of Toray Co.; density 1.10 g/cm$^3$, melting point 196° C.) was used.

Reference Example 1

A heat-drawn multi-lamellar vessel (cup) was produced and evaluated in the same manner as in Example 11 except that the cup shape parameters used were top 64 mmΦ, bottom 60 mmΦ, depth 35 mm, and draw ratio 3.0.

Reference Example 2

A heat-drawn multi-lamellar vessel (cup) was produced and evaluated in the same manner as in Example 11 except that the cup shape parameters used were top 64 mmΦ, bottom 60 mmΦ, depth 350 mm, and draw ratio 22.0.

The results of evaluations made in Examples 11~19, Comparative Examples 4 and 5 and Reference Examples 1 and 2 are collectively presented in Table 3.

The unit of gas barrier properties is "cc/day-air" per cup.

In the table, "–" stands for "not measured". Thus, breaks occurred in the cup which would be reflected as an overestimation of oxygen permeability.

TABLE 3

| | Appearance | Shape | Gas barrier properties |
|---|---|---|---|
| Example 11 | ⊚ | ○ | 0.0074 |
| Example 12 | ⊚ | ○ | 0.0060 |
| Example 13 | ⊚ | ○ | 0.0054 |
| Example 14 | ⊚ | ○ | 0.0164 |
| Example 15 | ⊚ | ○ | 0.0040 |
| Example 16 | ⊚ | ○ | 0.0036 |
| Example 17 | ⊚ | ○ | 0.0168 |
| Example 18 | ⊚ | ○ | 0.0043 |
| Example 19 | ⊚ | ○ | 0.0041 |
| Comparative Example 4 | x | ○ | — |
| Comparative Example 5 | x | ○ | — |
| Reference Example 1 | ⊚ | x | 0.0032 |
| Reference Example 2 | x | ○ | — |

INDUSTRIAL APPLICABILITY

The resin composition of the invention, which is comprised of EVOH, a polyamide resin having a melting point not exceeding 160° C., and a boron compound as described above, is outstanding in gas barrier properties, low-temperature heat-drawability, long-run melt-moldability and appearance, among other characteristics, and as such is useful as a packaging material for various packaging applications (foods, drinks, cosmetics, pharmaceuticals, industrial chemicals, agrochemicals, solvents, fuels, etc.). Particularly it is of great use in the form of a laminate with polystyrene resin and/or polyolefin resin.

What is claimed is:

1. A resin composition comprising a saponified ethylene-vinyl acetate copolymer (A), a polyamide resin having a melting point not exceeding 160° C. (B), and a boron compound (C).

2. A resin composition according to claim 1 wherein the weight ratio A/B of the saponified ethylene-vinyl acetate copolymer (A) to the polyamide resin having a melting point not exceeding 160° C. (B) in the composition is 50/50~99/1 and that the amount of the boron compound (C) in the composition is 0.001~1 weight part as boron relative to 100 weight parts of the saponified ethylene-vinyl acetate copolymer (A) and polyamide resin (B) combined.

3. A laminate comprising a multi-lamellar shaped article comprising a resin composition layer (X) composed of a saponified ethylene-vinyl acetate copolymer (A), a polyamide resin having a melting point not exceeding 160° C. (B) and a boron compound (C) and a thermoplastic resin layer (Y) disposed on at least one side of the layer (X).

4. A laminate according to claim 3 wherein the thermoplastic resin layer (Y) is a polystyrene resin layer (Y1) or a polyolefin resin layer (Y2).

5. A laminate according to claim 3 wherein the laminar construction thereof is a polystyrene resin layer (Y1)/adhesive resin layer (AD)/ resin composition layer (X)/adhesive resin layer/ polystyrene resin layer (Y1), a polyolefin resin layer (Y2)/adhesive resin layer (AD)/ resin composition layer (X)/adhesive resin layer/ polystyrene resin layer (Y1) or a polyolefin resin layer (Y2)/adhesive resin layer (AD)/ resin composition layer (X)/adhesive resin layer/ polyolefin resin layer (Y2).

6. A laminate according to claim 3 wherein the multi-lamellar shaped article has been draw-molded in a draw ratio $S_1/S_0$ of 4~20, assuming that $S_0$ is the area of a sheet to be heat-drawn and $S_1$ is the area of the part of the sheet heat-drawn.

* * * * *